I. KINNEY.
Clamps.
No. 146,190.                         Patented Jan. 6, 1874.
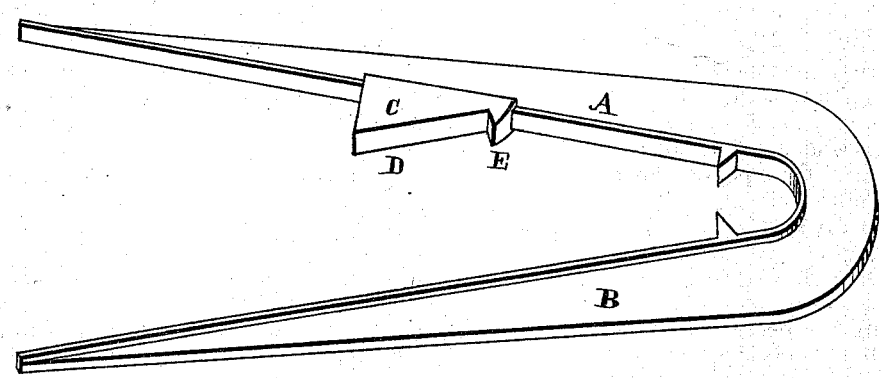
Witnesses,
Henry Beech
John B Smyth
Inventor,
Israel Kinney

UNITED STATES PATENT OFFICE.

ISRAEL KINNEY, OF LONDON, CANADA.

IMPROVEMENT IN CLAMPS.

Specification forming part of Letters Patent No. 146,190, dated January 6, 1874; application filed September 13, 1873.

*To all whom it may concern:*

Be it known that I, ISRAEL KINNEY, of the city of London, in the county of Middlesex, Province of Ontario, Canada, have invented an Improvement in Clamps, of which the following is a specification:

The object of my invention is an improvement in clamping-tools, which can be used for the purposes for which vises, wrenches, and hand-screws are generally used, and rendered capable of being applied to purposes and in places where those tools are not available, as well as affording greater convenience to the workman.

My invention, as shown by reference to the accompanying drawings, consists of two metal bars, A B, placed angularly to each other, in combination with a sliding jaw, C, made to fit on one of them so as to slide up and down upon it. These bars are connected at both ends, as shown in Figure 1. The inner face D of the sliding jaw is parallel with the bar opposite, and furnished with a projecting piece or lug to facilitate moving the jaw, and is marked E in drawings.

In using my clamping-tool this jaw is moved along the bar to the distance required to admit the bolt or other substance, which is then firmly grasped between the opposite bar and the face of the jaw; or, when occasion requires, two sliding jaws may be used instead of one, and the substance is then grasped between them.

I claim as my invention—

The combination of one or more sliding jaws with the metal bars A B, running angularly to each other and open at the widest end.

London, September 19, 1873.

ISRAEL KINNEY.

Witnesses:
HENRY BEECH,
JOHN B. SMYTH.